United States Patent [19]

Pomme

[11] Patent Number: 5,749,239
[45] Date of Patent: May 12, 1998

[54] REFRIGERANT FLUID RESERVOIR FOR A HEAT PUMP INSTALLATION

[75] Inventor: Vincent Pomme, Montigny le Bretonneux, France

[73] Assignee: Valeo Climatisation, La Verriere, France

[21] Appl. No.: 749,175

[22] Filed: Nov. 14, 1996

[30] Foreign Application Priority Data

Nov. 20, 1995 [FR] France ................ 95 13736

[51] Int. Cl.$^6$ ........................................ F25B 41/04
[52] U.S. Cl. .................. 62/225; 62/324.6; 62/509
[58] Field of Search .................. 62/225, 324.1, 62/324.6, 509

[56] References Cited

U.S. PATENT DOCUMENTS

| | | | |
|---|---|---|---|
| 3,525,234 | 8/1970 | Widdowson | 62/509 |
| 3,785,164 | 1/1974 | Wrenn, Jr. | 62/509 |
| 3,858,407 | 1/1975 | Schumacher | 62/217 |
| 3,939,669 | 2/1976 | Schumacher | 62/217 |
| 4,100,762 | 7/1978 | Davis et al. | 62/160 |
| 4,227,901 | 10/1980 | Lange | 55/301 |
| 4,313,314 | 2/1982 | Boyanich | 62/324.1 |
| 4,320,000 | 3/1982 | Lange et al. | 210/117 |
| 4,756,166 | 7/1988 | Tomasov | 62/509 |
| 5,454,233 | 10/1995 | Naujock | 62/509 |

FOREIGN PATENT DOCUMENTS 2 369 510    5/1978   France.

*Primary Examiner*—William E. Tapolcai
*Attorney, Agent, or Firm*—Morgan & Finnegan

[57] ABSTRACT

A heat pump installation, especially an air conditioning installation for a motor vehicle, includes a unit consisting of a refrigerant fluid reservoir which comprises a vessel closed by a cover which carries an expansion device. The expansion device is connected firstly to an inlet chamber formed in the reservoir and containing a dehumidifying filter, and secondly to an outlet chamber formed in the reservoir and separated from the inlet chamber by a separating member. The separating member is trapped between the cover and the vessel.

13 Claims, 2 Drawing Sheets

REFRIGERANT FLUID RESERVOIR FOR A HEAT PUMP INSTALLATION

FIELD OF THE INVENTION

This invention relates to a reservoir for a refrigerant fluid, for incorporation in a heat pump installation, and in particular (though without limitation), for an air conditioning installation for a motor vehicle. In particular, the invention relates to reservoirs of the type which include a fluid inlet for connection to a condenser and a fluid outlet for connection to an evaporator, the reservoir containing a dehumidifying filter.

BACKGROUND OF THE INVENTION

As is well known, a heat pump installation also includes a compressor and an expansion valve device or depressurizer, which are connected in a closed circuit with the condenser, the evaporator, and the refrigerant fluid reservoir. This fluid is compressed into the form of a hot gas by the compressor before being delivered to the condenser, in which it is condensed to a hot liquid. The liquid then passes through the reservoir (which may also be referred to as a bottle). In the reservoir it is dehumidified or dehydrated. The dry liquid is then expanded into the form of a mixture of liquid and cold gas in the expansion device before, being delivered into the evaporator, which converts it into a cold gas before it is returned to the compressor.

Where such an installation is used for air conditioning in a motor vehicle, an air stream is cooled in contact with the evaporator before being delivered into the cabin of the vehicle. Such an installation calls for a large number of components, which increases its overall volumetric size and weight, and which is therefore somewhat inconvenient where the installation has to be fitted into a motor vehicle, because available space is becoming more and more limited in modern motor vehicles.

It is also well known to operate such a heat pump installation in a reversible way, so that by reversing the direction of flow of the refrigerant fluid, the heat exchanger which, in an air conditioning application, would function as a condenser, becomes an evaporator; at the same time, the other heat exchanger, which acts as an evaporator in the air conditioning installation serves as a condenser when the flow direction is reversed. Such an installation is of particular relevance to motor vehicle applications, because the same heat exchanger can be used either as an evaporator for air conditioning of the cabin or as a condenser for heating the cabin. In such a case a single heat exchanger can be used both for air conditioning and for heating.

However, a complex fluid circuit is necessary in such an installation in order to achieve the reversal of the flow direction of the fluid.

DISCUSSION OF THE INVENTION

An object of the invention is to overcome the above mentioned drawbacks.

According to the invention, a refrigerant fluid reservoir for a heat pump installation, of the type comprising a fluid inlet adapted to be connected to a condenser, and a fluid outlet adapted to be connected to an evaporator, with the reservoir containing a dehumidifying filter, is characterised in that the reservoir carries an expansion device which is connected, firstly to an inlet chamber formed in the reservoir and containing the dehumidifying filter, and secondly, to an outlet chamber in the reservoir, the said outlet chamber being separated from the inlet chamber by a separating member.

With this arrangement, it is possible to obtain three main functions from a single unit, namely that of a refrigerant fluid reservoir; a filtering or dehydrating function for the refrigerant fluid in the liquid phase; and a depressurising function for the refrigerant fluid.

According to a preferred feature of the invention, the expansion device is mounted on the outside of the reservoir.

The inlet chamber is preferably defined in the lower part of the reservoir, while the outlet chamber is defined in an upper part of the reservoir, with reference to the normal attitude in which the reservoir is mounted for use. In this preferred embodiment, the expansion device is mounted on the upper part of the reservoir, and is connected, firstly to the inlet chamber through an internal tube which passes through the separating member and is open into the inlet chamber, and, secondly, to the outlet chamber via an external tube, for example a bent tube.

The expansion device preferably includes a remote bulb.

According to another preferred feature of the invention, the form of the reservoir is generally that of a cylinder of revolution, thereby defining an axis, and the said internal tube is disposed coaxially in the reservoir.

The reservoir preferably comprises an open vessel and a cover, with the cover closing the open mouth of the vessel and holding the separating member between the cover and the vessel.

According to a further preferred feature of the invention, the inlet of the reservoir is in communication with the inlet chamber via a non-return valve which prevents any flow of fluid from the inlet chamber towards the inlet of the reservoir, while the outlet of the reservoir is in communication with the outlet chamber via a non-return valve which prevents any flow of the fluid from the outlet of the reservoir towards the outlet chamber.

In another embodiment of the invention, the separating member defines two intermediate chambers which communicate, respectively, with two lateral openings or ports of the reservoir which constitute the inlet and outlet of the reservoir respectively, or vice versa. In this embodiment, each intermediate chamber is in communication with the inlet chamber through a non-return valve which prevents any flow of fluid from the inlet chamber to the intermediate chamber, and each intermediate chamber is in communication with the outlet chamber through a non-return valve which prevents any flow of fluid from the intermediate chamber to the outlet chamber.

In this way a reversible reservoir is obtained, in which either one of the two lateral openings, or side ports, is able to serve as the inlet or outlet of the reservoir for the refrigerant fluid, while the other one of these ports serves as the outlet or inlet for the fluid, respectively.

In this embodiment of the invention, the separating member preferably includes a first wall which separates the intermediate chambers from the inlet chamber, a second wall which separates the intermediate chambers from the outlet chamber, and a third wall which joins the first and second walls together and separates the two intermediate chambers from each other.

The said first wall and second wall of the separating, or intermediate, member then preferably have a generally circular form and lie parallel to each other, while the said third wall joins the first and second walls together along a diametral plane of the reservoir.

Where the reservoir comprises an open vessel and a cover closing the open vessel, the said first wall is preferably arranged to bear against a surface of the vessel, while the said second wall is adapted to bear against a surface of the cover, and the side ports of the reservoir are preferably formed in the cover itself.

The expansion device of a reservoir according to the invention is preferably a bidirectional thermostatic depressurizer with a remote bulb, and is preferably also provided with a facility for external pressure equalisation.

Further features and advantages of the invention will appear more clearly on a reading of the following detailed description of a preferred embodiment of the invention, which is given by non-limiting example only and with reference to the accompanying drawings.

DESCRIPTION OF A PREFERRED EMBODIMENT OF THE INVENTION

Figure 1:
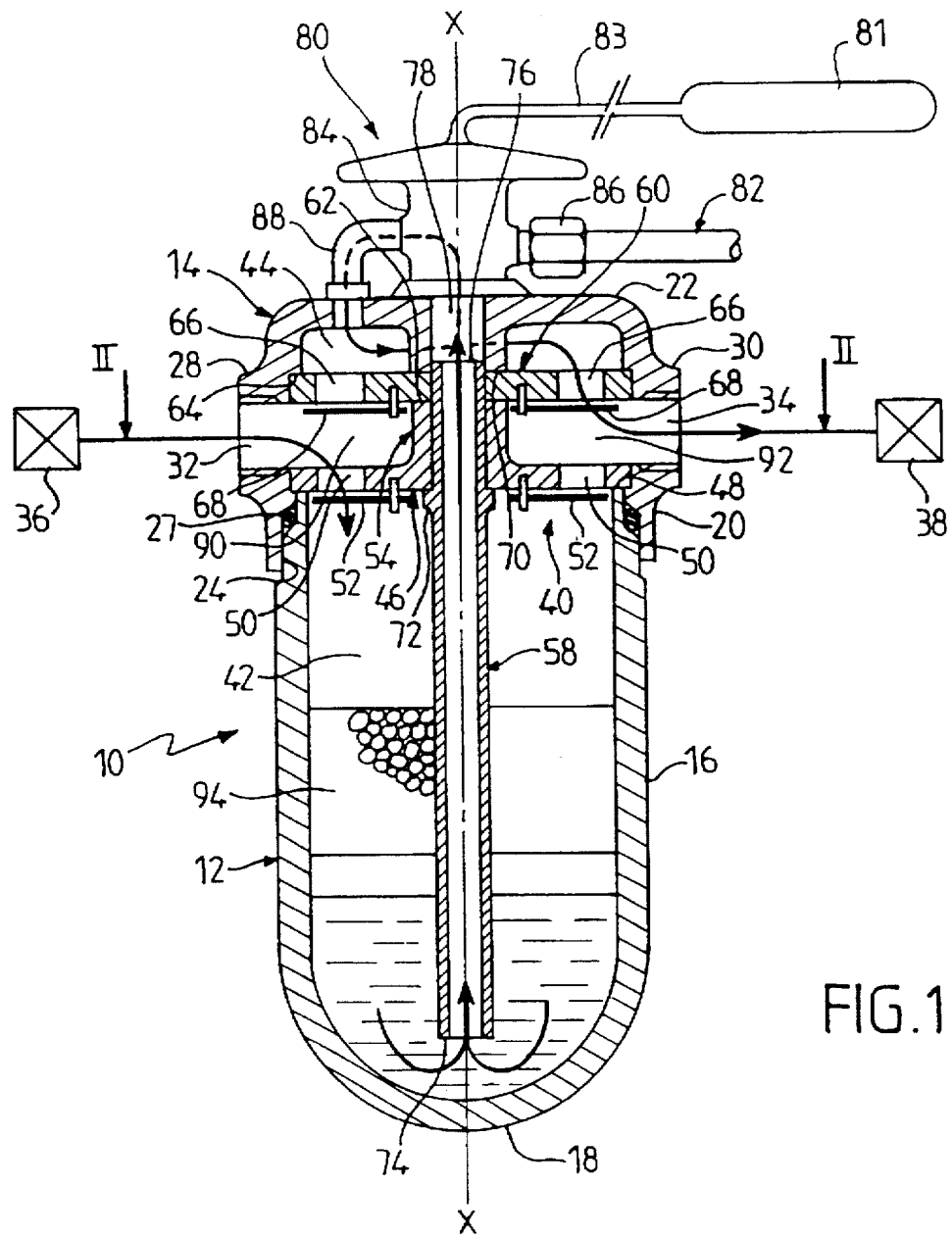
FIG. 1 is a view, shown partly in cross section, of a refrigerant fluid reservoir in accordance with the invention.

Reference is first made to FIG. 1, which shows a reservoir 10 which includes an open vessel 12 and a cover 14. The vessel 12 has a side wall 16 of generally circular cylindrical form, defining an axis X—X, and a base portion 18 which is substantially hemispherical. The reservoir 10 is arranged to be disposed in a substantially vertical position, with its base portion 18 at the bottom.

The cover 14 comprises a side wall 20 of generally circular cylindrical shape on the axis X—X, together with a generally circular top wall 22. The side wall 20 is formed with an internal thread 24 which cooperates with an external thread 26 on the vessel side wall 16, so that the cover 14 can be screwed on to the vessel 12 with a sealing ring 27 being interposed. The side wall 20 of the cover is also formed with two diametrically opposed bosses 28 and 30, through which two lateral openings or side ports, 32 and 34 respectively, are formed.

In the operating mode shown in FIG. 1, the port 32 is arranged to be connected to a heat exchanger 36 which functions as a condenser, while the port 34 is arranged to be connected to a heat exchanger 38 which functions as an evaporator.

The reservoir also includes a separating member 40, which is fitted within the reservoir 10 during assembly. The separating member 40 delimits, within the reservoir 10, an inlet chamber 42 in the lower part of the reservoir, and an outlet chamber 44 which is formed in its upper part.

Figure 2:
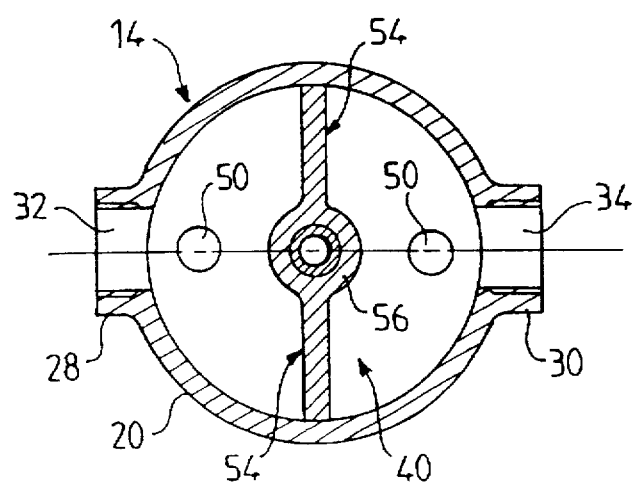
FIG. 2 is a view in cross section taken on the line 11—11 in FIG. 1.
Figure 3:
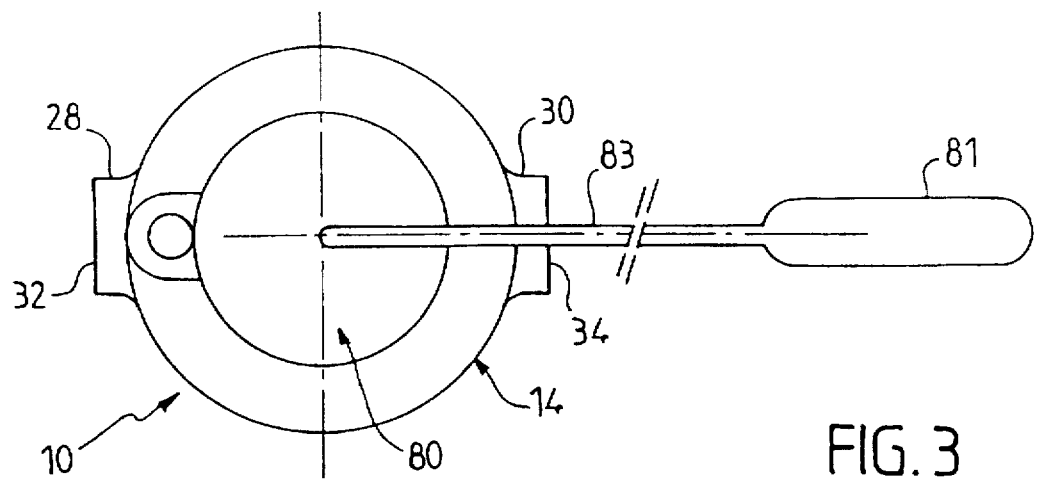
FIG. 3 is a top plan view of the reservoir of FIG. 1.

The separating member 40 includes a lower wall 46 of generally circular form, which bears against an annular surface 48. In this example, this surface 48 is the transverse terminal surface of the side wall 16 surrounding the open mouth of the vessel 12. Two diametrically opposed holes 50 (see FIGS. 1 and 2) are formed through the wall 46 of the separating member 40. Two non-return valves 52 are carried by the member 40 on the same side of the latter as the inlet chamber 42, each of these valves being associated with a respective one of the holes 50.

The separating member 40 also has a diametral wall 54 which rises from the wall 46 in the region of a diameter of the latter. The wall 54 is formed with a cylindrical bore 56 on the axis X—X. A tube 58, which is again on the axis X—X, extends upwardly within the vessel 16 and through the cylindrical bore 56 of the diametral wall 54 of the separating member. The separating member 40 also includes a circular upper wall 60 which lies parallel to the lower wall 46 and engages against an upper face 62 of the diametral wall, or bulkhead, 54. The upper wall 60 bears at its periphery on an annular surface 64 formed in a rebate in the cylindrical inner surface of the side wall of the cover 14.

The upper wall 60 has a central through hole aligned with the bore 56, and the tube 58 extends through this hole in the wall 60. The wall 60 also has two diametrically opposed further holes 66, and carries two further non-return valves 68 on the side opposite to the outlet chamber 44. Each of these non-return valves 68 is associated with a respective one of the holes 66. The central part of the upper wall 60 bears against an annular surface 70, which is the lower end surface of a portion of the cover 14 which extends downwardly from the top wall 22 of the latter.

The tube 58 has a peripheral bead 72, which is engaged against the lower wall 46 of the separating member 40. The tube 58 has an open lower end 74, which is open at the bottom of the vessel 12, and an open top end 76 which is open to the outside of the reservoir through an axial passage 78 formed through the cover 14.

The cover 14 carries an external expansion device, or depressurizer, 80 of the bidirectional type, which includes a remote bulb 81 mounted at the end of a duct 83. The expansion device 80 communicates with the axial passage 78, and is provided with an external pressure equalising pipe 82, which is attached to the body 84 of the expansion device 80 by means of a nut 86. A bent tube 88 has one end which extends through the body 84 of the expansion device, while its other end extends through the top wall 22 of the cover 14. The bent tube 88 brings the axial passage 78 and the inlet chamber 44 into communication with each other.

The separating member 40 has two internal intermediate chambers 90 and 92 which are diametrically opposed to each other, and which communicate with the ports 32 and 34 respectively. In addition, the outlet chamber 42, within the vessel 12, contains a dehumidifying filter 94.

Figure 4:
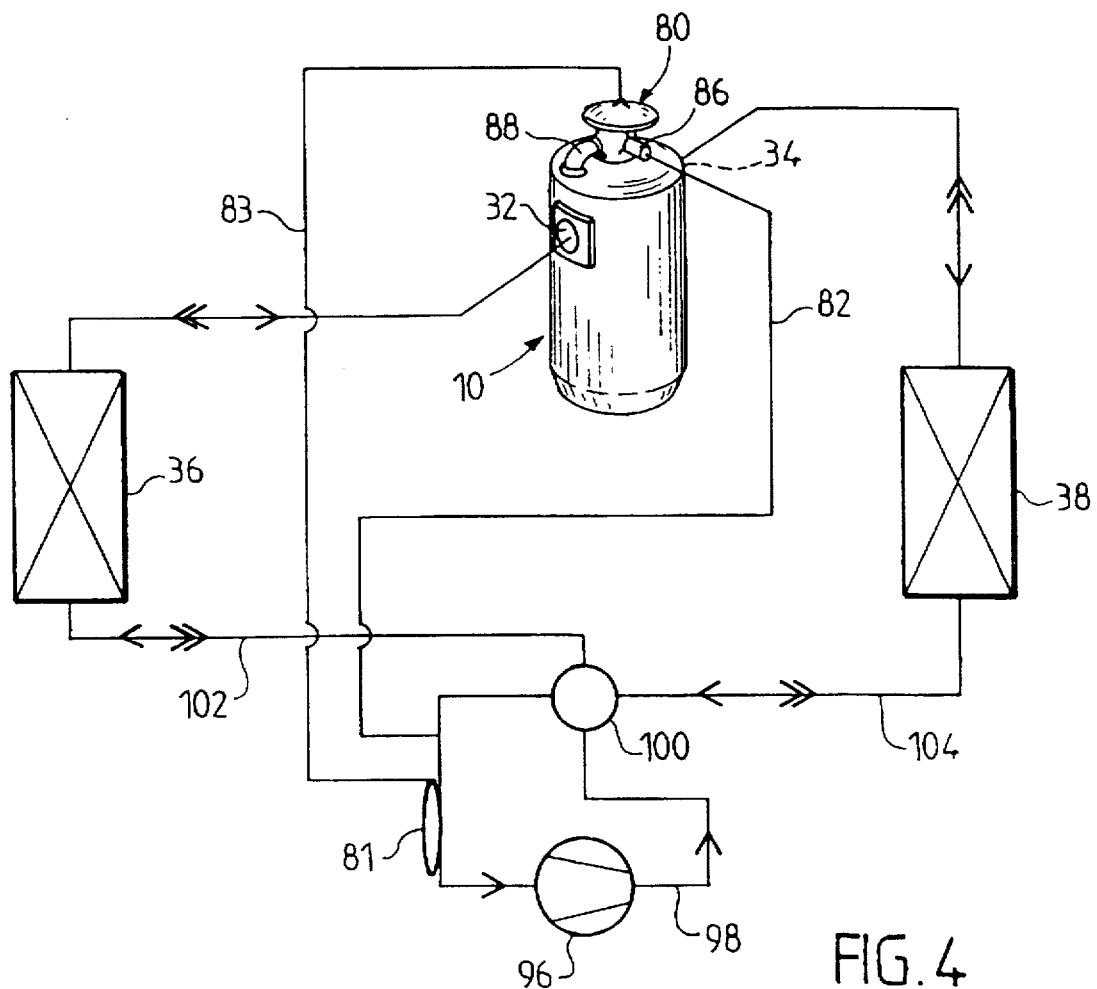
FIG. 4 is a diagrammatic representation of a heat pump installation having a reservoir in accordance with the invention.

The reservoir shown in FIG. 1 can be incorporated into a refrigerant fluid circuit which includes, apart from the reservoir 10 and the two heat exchangers 36 and 38, a compressor 96 (see FIG. 4). With reference to FIG. 4, the compressor 96 is connected in a loop 98 which includes a valve 100 of the four-way type. The pressure equalising pipe 82 is connected into the loop 98. In addition, the remote bulb 81 is located in the immediate proximity of the loop 98. The four-way valve 100 is connected to the ports 32 and 34 of the reservoir 10 through two pipes 102 and 104, on which the heat exchangers 36 and 38, respectively, are connected.

The four-way valve 100 is adapted to assume two different positions, such as to cause the refrigerant fluid to flow, respectively, in two different directions of flow. In a first one of these flow directions, indicated in FIG. 4 by single arrows, the compressor 96 delivers the refrigerant fluid directly into the heat exchanger 36 which acts as a condenser, while the heat exchanger 38 acts as an evaporator. This flow direction thus corresponds to that in FIG. 1.

In the other, or second, flow direction which is indicated in FIG. 4 by double arrows, the compressor 96 delivers the refrigerant fluid directly to the heat exchanger 38, which in this case is working as a condenser, while the heat exchanger 36 is working as an evaporator.

When the refrigerant fluid is flowing in the first flow direction indicated by single arrows in FIG. 4, it is first compressed, as a hot gas, by the compressor 96 before being delivered to the heat exchanger 36 acting as a condenser. The fluid is condensed in the latter to a hot liquid, which then passes into the reservoir 10 through the port 32. The fluid reaches the intermediate chamber 90, and then passes into the inlet chamber 42 via one of its two holes 50, deflecting the associated non-return valve 52 as it does so. The fluid passes through the dehumidifying filter 94, from which it reaches the bottom of the reservoir. From there the fluid passes into the tube 58, and then up the latter so as to reach the inlet of the expansion device 80. It leaves the expansion device through the bent tube 88, to arrive in the outlet chamber 44 of the reservoir shown in FIG. 1.

At the outlet of the expansion device, the refrigerant fluid is in the form of a mixture of liquid and cold gas. The expanded fluid then passes through one of the holes 66, displacing as it does so the corresponding non-return valve 68, to leave the reservoir 10 via the port 34, from which the refrigerant fluid is delivered to the heat exchanger 38 (acting as an evaporator). The latter converts the fluid into cold gas, which is then returned to the compressor 96.

When the four-way valve 100 is set so as to cause the refrigerant fluid to flow in the second flow direction mentioned above, the fluid enters the reservoir 10 via the port 34 and leaves it via the port 32, as indicated by the double arrows in FIG. 4. As mentioned above, in this case, the heat exchangers 36 and 38 act as an evaporator and a condenser respectively. In this case, the fluid enters the inlet chamber 42 via the other hole 50 in the lower wall 46 of the separating member 40 (i.e. the right hand hole 50 in FIG. 2). It then passes from the inlet chamber 42 into the expansion device 80, via the tube 58 as before. Again as before, it then flows into the outlet chamber 44 and thence into the intermediate chamber 90 via the left hand one of the holes 66 in FIG. 1, in the upper wall 60 of the intermediate member 40. From the chamber 90, the fluid leaves the reservoir 10 via the port 32.

It will be seen from the foregoing that the reservoir 10 has a particularly compact form of construction which is able to operate in a reversible manner.

In a preferred embodiment of the invention, one of the two heat exchangers is accordingly able to serve both as an evaporator for delivering a conditioned air stream into the cabin of a motor vehicle, and also as a condenser for heating an air stream which is used for heating the same cabin.

The invention is of course not limited to the embodiment described above by way of example only. In a simplified version of the reservoir according to the invention, the reservoir is arranged so as to be used only in one direction of flow of the fluid. In that case it is not necessary to provide a separating member which defines intermediate chambers between the inlet and outlet chambers.

The main application of the apparatus of this invention is in heating and/or air conditioning systems for motor vehicles, but it may also be used in other applications where heating and/or cooling are required, and not necessarily in motor vehicles.

What is claimed is:

1. A refrigerant fluid reservoir for a heat pump installation comprising a fluid circuit, a condenser connected in said circuit, and an evaporator connected in the circuit, the reservoir having a fluid inlet and a fluid outlet for connection to said condenser and said evaporator respectively, the reservoir further including a dehumidifying filter contained within it, wherein the reservoir defines an internal inlet chamber and an internal outlet chamber, and further includes a separating member separating said inlet and outlet chambers from each other, the dehumidifying filter being contained in the inlet chamber, and the reservoir further including an expansion device and means connecting the expansion device operatively between said inlet and outlet chambers further including a first non-return valve interposed between said inlet of the reservoir and said inlet chamber, for preventing flow of fluid from the inlet chamber to the inlet, and a second non-return valve interposed between said outlet of the reservoir and the outlet chamber, for preventing flow of fluid from the outlet of the reservoir to the outlet chamber.

2. A reservoir according to claim 1, wherein the expansion device is mounted on the outside of the reservoir.

3. A reservoir according to claim 1, having an upper part and a lower part, the inlet and outlet chambers being defined in said lower and upper parts respectively.

4. A reservoir according to claim 3, wherein the said upper part of the reservoir carries the expansion device, the reservoir further including an internal tube extending through the separating member, and an external tube connecting said outlet chamber with the expansion device, said internal tube connecting the expansion device with the said inlet chamber.

5. A reservoir according to claim 1, wherein the expansion device includes a remote bulb.

6. A reservoir according to claim 4, comprising a generally cylindrical vessel defining an axis thereof, said internal tube being disposed coaxially within the said vessel.

7. A reservoir according to claim 1, comprising a vessel open at one end, and a cover closing the open end of the vessel, said separating member being interposed between the vessel and the cover so as to be retained on the vessel by the cover.

8. A reservoir according to claim 1, for connection in a said fluid circuit adapted for reversible fluid flow, the reservoir having two lateral ports to constitute said inlet and outlet of the reservoir respectively with fluid flow in the circuit in a first direction, and to constitute said outlet and inlet respectively with said flow in a second direction in the circuit, the separating member defining two intermediate chambers, each communicating with a respective one of the two said ports, and further including a non-return valve interposed between each intermediate chamber and the inlet chamber, for preventing any flow of fluid from the inlet chamber to the corresponding intermediate chamber, and a further non-return valve interposed between each intermediate chamber and the outlet chamber, for preventing any flow of fluid from the corresponding intermediate chamber to the outlet chamber.

9. A reservoir according to claim 8, wherein said separating member comprises a first wall separating the intermediate chambers from the inlet chamber, a second wall separating the intermediate chambers from the outlet chamber, and a third wall joining said first and second walls together and separating the intermediate chambers from each other.

10. A reservoir according to claim 9, wherein said first and second walls of the separating member are generally circular and parallel to each other, the reservoir defining a diametral plane and said third wall joining said first and second walls together along said diametral plane.

11. A reservoir according to claim 9, comprising an open vessel and a cover closing said vessel, the vessel having a first engagement surface and the cover having a second engagement surface, said first and second walls of the separating member being adapted to engage against said first and second engagement surfaces respectively, with the cover defining the two said lateral ports.

12. A reservoir according to claim 1, wherein the expansion device is a bidirectional depressurizer having a remote bulb.

13. A refrigerant fluid reservoir for a heat pump installation comprising a fluid circuit, a condenser connected in the said circuit, and an evaporator connected in the said circuit, the reservoir having a fluid inlet and a fluid outlet for connection to a said condenser and a said evaporator respectively, the reservoir further including a dehumidifying filter contained within it, wherein the reservoir defines an internal inlet chamber and an internal outlet chamber, and further includes a separating member separating the said inlet and outlet chambers from each other, the dehumidifying filter being contained in the inlet chamber, and the reservoir further including an expansion device and means connecting the expansion device operatively between the said inlet and outlet chambers for connection in said fluid circuit adapted for reversible fluid flow, the reservoir having two lateral ports to constitute the inlet and outlet of the reservoir respectively with fluid flow in the circuit in a first direction, and to constitute the outlet and inlet respectively with the flow in a second direction in the circuit, the separating member defining two intermediate chambers, each communicating with a respective one of the two said ports, and further including a non-return valve interposed between each intermediate chamber and the inlet chamber, for preventing any flow of fluid from the inlet chamber to the corresponding intermediate chamber, and a further non-return valve interposed between each intermediate chamber and the outlet chamber, for preventing any flow of fluid from the corresponding intermediate chamber to the outlet chamber.

* * * * *